United States Patent
Stanz et al.

(10) Patent No.: US 10,843,596 B2
(45) Date of Patent: Nov. 24, 2020

(54) REAR SEAT/KINEMATIC/SEAT BACK FOLDING WITH RESISTANCE CURVE

(71) Applicant: ADIENT LUXEMBOURG HOLDING S.À R.L., Luxembourg (LU)

(72) Inventors: Kannan Stanz, Plymouth, MI (US); Keith Ziegler, Plymouth, MI (US); Ornela Zekavica, Plymouth, MI (US); Vasile Bozintan, Plymouth, MI (US)

(73) Assignee: Adient Luxembourg Holding S.á r.l., Luxembourg (LU)

( * ) Notice: Subject to any disclaimer, the term of this patent is extended or adjusted under 35 U.S.C. 154(b) by 186 days.

(21) Appl. No.: 15/766,592

(22) PCT Filed: Sep. 16, 2016

(86) PCT No.: PCT/US2016/052106
§ 371 (c)(1),
(2) Date: Apr. 6, 2018

(87) PCT Pub. No.: WO2017/062153
PCT Pub. Date: Apr. 13, 2017

(65) Prior Publication Data
US 2018/0297494 A1    Oct. 18, 2018

Related U.S. Application Data

(60) Provisional application No. 62/238,843, filed on Oct. 8, 2015.

(51) Int. Cl.
*B60N 2/22*    (2006.01)
*B60N 2/02*    (2006.01)
(Continued)

(52) U.S. Cl.
CPC .......... *B60N 2/2236* (2013.01); *B60N 2/005* (2013.01); *B60N 2/02* (2013.01); *B60N 2/206* (2013.01);
(Continued)

(58) Field of Classification Search
CPC ........ B60N 2/206; B60N 2/3009; B60N 2/20; B60N 2/2236; B60N 2/02; B60N 2/005; B60N 2/30; B60N 2/22; B60N 2/2227
(Continued)

(56) References Cited

U.S. PATENT DOCUMENTS 2,536,157 A  *  1/1951  Campanelli .............. A47C 1/16
                                                297/252
3,328,077 A  *  6/1967  Krasinski ................. B60N 2/36
                                                297/378.14

(Continued)

FOREIGN PATENT DOCUMENTS

EP     2620667 A1   7/2013
GB     2358132 A    7/2001
(Continued)

*Primary Examiner* — Milton Nelson, Jr.
(74) *Attorney, Agent, or Firm* — Marshall & Melhorn, LLC

(57) ABSTRACT

A damper is arranged between the seat backrest and the seat base. This damper applies a resistance to seat backrest movement, especially movement from the vertical position to the folded position. The damper includes a pin and profile mounted on the seat backrest and seat base respectively, or vice versa. The pin and profile slide against each other during movement of the seat backrest relative to the seat base. The shape, size, material, and/or the surface characteristics of the pin and profile determine the resistance to movement of the seat backrest. These parameters of the pin and profile can be varied, especially along different portions of the profile to apply the desired resistance at different
(Continued)

angular positions of the seat backrest with respect to the seat base.

19 Claims, 4 Drawing Sheets

(51) Int. Cl.
 *B60N 2/005* (2006.01)
 *B60N 2/20* (2006.01)
 *B60N 2/30* (2006.01)

(52) U.S. Cl.
 CPC .............. *B60N 2/22* (2013.01); *B60N 2/2227* (2013.01); *B60N 2/3009* (2013.01)

(58) Field of Classification Search
 USPC .......................................... 16/361; 297/378.1
 See application file for complete search history.

(56) References Cited

U.S. PATENT DOCUMENTS

| | | | | |
|---|---|---|---|---|
| 4,386,450 A * | 6/1983 | Krauss | .................... | A47B 46/00 16/361 |
| 4,848,840 A * | 7/1989 | Toya | ...................... | B60N 2/753 297/411.32 |
| 4,882,807 A * | 11/1989 | Frye | ........................ | E05D 11/06 16/225 |
| 5,454,624 A * | 10/1995 | Anglade | ............... | B60N 2/0292 297/321 |
| 5,669,107 A * | 9/1997 | Carlsen | ................ | E05D 11/082 16/348 |
| 6,045,190 A | 4/2000 | Ward et al. | | |
| 2003/0030315 A1 | 2/2003 | Shephard | | |
| 2013/0057042 A1 | 3/2013 | Kortwig et al. | | |
| 2014/0152065 A1 | 6/2014 | Boehm et al. | | |
| 2015/0008629 A1 | 1/2015 | Kuno et al. | | |

FOREIGN PATENT DOCUMENTS

| | | |
|---|---|---|
| GB | 2423014 A | 8/2006 |
| WO | 2014/075819 A1 | 5/2014 |
| WO | 2015/048110 A1 | 4/2015 |

* cited by examiner

REAR SEAT/KINEMATIC/SEAT BACK FOLDING WITH RESISTANCE CURVE

CROSS REFERENCE TO RELATED APPLICATIONS

This application is a United States National Phase Application of International Application PCT/US2016/052106 filed Sep. 16, 2018 which claims the benefit of priority U.S. Provisional Application 62/238,843, filed Oct. 8, 2015, the entire contents of which are incorporated herein by reference.

FIELD OF THE INVENTION

The present invention relates to a folding seat with a predetermined and selectable resistance curve as the seat is folded, and especially to automobile seats where the resistance to movement of the seat backrest from the seated position to the folded position is able to be customized and varies as a function of the seat position.

BACKGROUND OF THE INVENTION

Is often desirable for a space to be used for different purposes. This is especially true in a vehicle where space is often limited. Sometimes a space, such as in a vehicle, is desired for being occupied by a person in a sitting position. Other times that same space is desired to be used to store or transport cargo. If the space is to be occupied by a seated person in comfort, the space should have a seat base/cushion and a seat backrest. If this space is to be used for cargo, the seat backrest often interferes with storing cargo, especially if the seat backrest is adjacent an additional cargo area. This is especially true with the rear seats in a vehicle that are arranged adjacent a cargo area behind the rear seats.

Folding the seat backrest down is advantageous in that it gives a larger homogeneous space to the already existing cargo space. When designing a seat with a folding backrest, the folding mechanism is often designed to have a sufficient support for the seat backrest, especially in view of automobile safety regulations, and to allow the seat backrest to easily fold from the seated position to the folded position. The seated position of the seat backrest usually has the longitudinal axis of the seat backrest angularly spaced from a vertical axis. When folding the seat backrest, the seat backrest is usually moved from the seated position, up to the vertical position, and then down to a folded position which is more angularly adjacent to the seat base.

As the seat backrest passes from the upper most vertical position to the lower folded position, gravity affects the seat backrest, and the seat backrest performs a falling type motion that is assisted by gravity. The increase in speed by gravity to this falling type motion adds a complication, or at least a variation, to controlling the seat backrest as it moves from the seated position to the folded position. For example, moving the seat backrest from the somewhat reclined seated position to the more upper vertical position has gravity hindering the motion and the operator must applying force to move the seat against the force of gravity. As the seat backrest moves past the upper vertical position and toward the lower folded position gravity is forcing the seat down. In an operator often must apply force to the seat in a direction against the intended movement in order to slow the seat during this falling type motion.

Alternatively, if no opposite force is applied to slow the seat during the falling type motion, the speed of the falling motion can be so large as to be disturbing to the person moving the seat, or the people in the vehicle, and maybe even cause injury. This is disadvantageous to the person changing the position of the seat and the other occupants of the vehicle.

SUMMARY OF THE INVENTION

It is an object of the present invention to make it easier to control movement of the seat from the seated position to the folded position, and to prevent the seat backrest from excessive speeds during the movement from the uppermost vertical position to the folded/lower position.

The present invention is advantageously applied to the seats of automobiles, especially the rear most seat in an automobile which is adjacent a cargo space that is arranged even more rearward in the vehicle. The present invention can also be applied to middle seats of a vehicle having three or more rows of seats, because such middle seats are often also folded down to make more room in the cargo space. While the front seats of a vehicle are less often folded down, this is beneficial on occasion, and the present invention can therefore also be applied to the front seats of such vehicles.

The present invention accomplishes this object by applying a damper between the seat backrest and the seat base. The seat backrest is pivotally mounted on the seat base between a seated position and a folded position. The damper has a guide arranged on one of the seat base and the seat backrest. The guide has a profile. A pin is arranged on the other of the seat base and the seat backrest. The pin is arranged to slide along and against the profile when the seat backrest moves between the first position and the second position. The pin and the profile being arranged and shaped to create a resistance to movement between the first position and the second position. The resistance preferably varies as a function of a relative angular position of the seat backrest to the seat base.

This damper applies a resistance to seat backrest movement, especially movement from the vertical position to the folded position. The shape, size, material, and/or the surface characteristics, inter alia, of the pin and profile determine the resistance to movement of the seat backrest. These parameters of the pin and profile can be varied, especially along different portions of the profile, and in different directions, to apply the desired resistance at different angular positions of the seat backrest with respect to the seat base. For example, the shape of the profile could include different curves, bumps, and narrowing and widening of a slot that the pin slides in.

In between the uppermost vertical position and the folded position, there is an intermediate position. This intermediate position who is preferably between 20° and 50° from the vertical position toward the folded position. Even more preferably, the intermediate position is 30° from the vertical position toward the folded position. It has been found that it is desirable that the resistance to movement from the vertical position to the folded position is at its maximum at this intermediate position.

In another preferred embodiment, the resistance is at a low level at the seated position. The resistance increases to a high level at an intermediate position arranged between the seated and folded positions. The resistance then decreases from the high level to another low level as the seat backrest moves from the intermediate position to the folded position.

By choosing a desired resistance at different angular positions of the seat backrest with respect to the seat base, the falling type motion of the seat backrest can be more easily controlled, especially with regard to the speed at which the seat backrest falls. In particular, the resistance, as a function of angular positions, can be chosen so that once the seat backrest passes the most upper vertical position and then moves toward the folded position, there is a decline in the force needed to slow the speed of the seat in its falling motion. This makes it easier to control the seat, and prevents disturbing occupants and/or operators from the excessive speed of, or injuries from, the seat backrest during the falling type motion.

The profile can advantageously be arranged in a slot of a guide structure, such as a plate. The pin is arranged to travel/move along/against the slot. One or both sides of the slot can then become the profile, or become profiles, for interacting with the pin. The resistance can be formed by friction between the pin and profile, and/or deformation of the pin or profile(s) as the seat backrest moves. In one embodiment, the pin is made of hardened steel and the profile is made of a material that will be deformed by the pin, such as a plastic.

To control the deformation of the profile, a deformation slot can be defined by the guide by a web that forms one side of the deformation slot/profile. The web is arranged between the profile and the deformation slot. The deformation slot is shaped to vary the shape of the web so that the web is arranged to deform when the seat backrest moves between the seated position and the folded position.

Seat backrests are usually hinged to a seat base at two or more locations, usually considered the right and left sides of the seat backrest. The damper of the present invention can be positioned at one or each of these hinges or pivot points. The present invention could also have several dampers along the pivot axis. The pin and guide can be made relatively small and lightweight, which allows for more space in the vehicle, and better performance of the vehicle. The simple design of the pin and guide also result in a lower manufacturing cost.

Depending on the type of resistance used in the damper to control the movement/speed, it can be more economical to have a large number of smaller, lighter and/or less expensive dampers arranged along the pivot axis than one or two larger/heavier/more expensive dampers on one, or both, of the left and right sides of the seat backrest.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
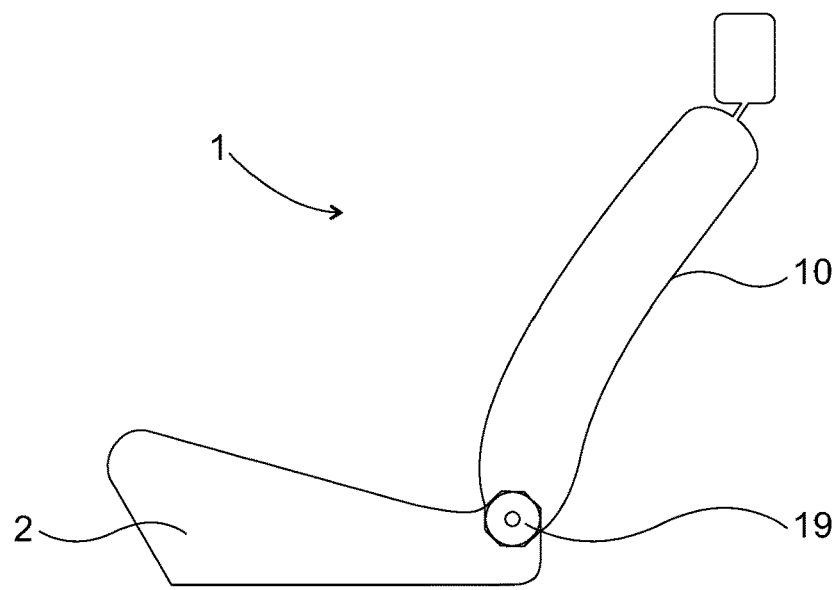
FIG. 1 is a schematic side view of a seat with a movable seat backrest.

Referring to the drawings in particular, FIG. 1 is a side view of a seat 1, that has a seat backrest 10 and a seat base/cushion 2. The seat backrest 10 is pivotally connected to the seat base 2 at a hinge area 19. The seat backrest 10 folds from its standard design/seated position, which is slightly reclined as shown in FIG. 1, to a position where it is more angularly closer to the seat base 2, where it can provide more cargo space to a vehicle. In the view of FIG. 1, this would mean a counterclockwise rotation of the seat backrest 10 about the hinge area 19, and preferably the seat backrest 10 would then lie on top of the seat base 2.

Figure 2:
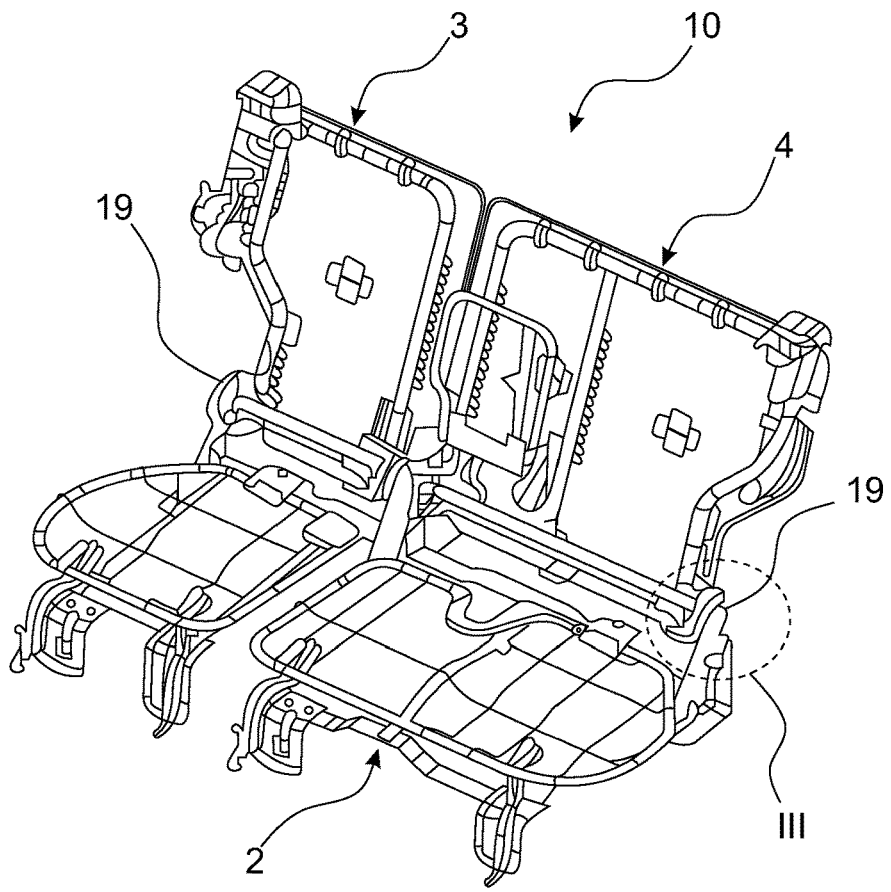
FIG. 2 is a perspective schematic view of a seat showing the frame and hardware.

The seat 1 is preferably the seat of a vehicle such as an automobile, and it can be the front, middle or rear seat. FIG. 2 is a perspective view of a middle or rear seat of an automobile showing the structural and support components, and omitting the fabric and cushion material. The middle or rear seats of an automobile are often bench type seats, and are often split or separated into right and left seats so that the respective seat backrest 10 can be folded down separately. FIG. 2 shows such a seat having separate right and left portions 3 and 4.

Figure 3:
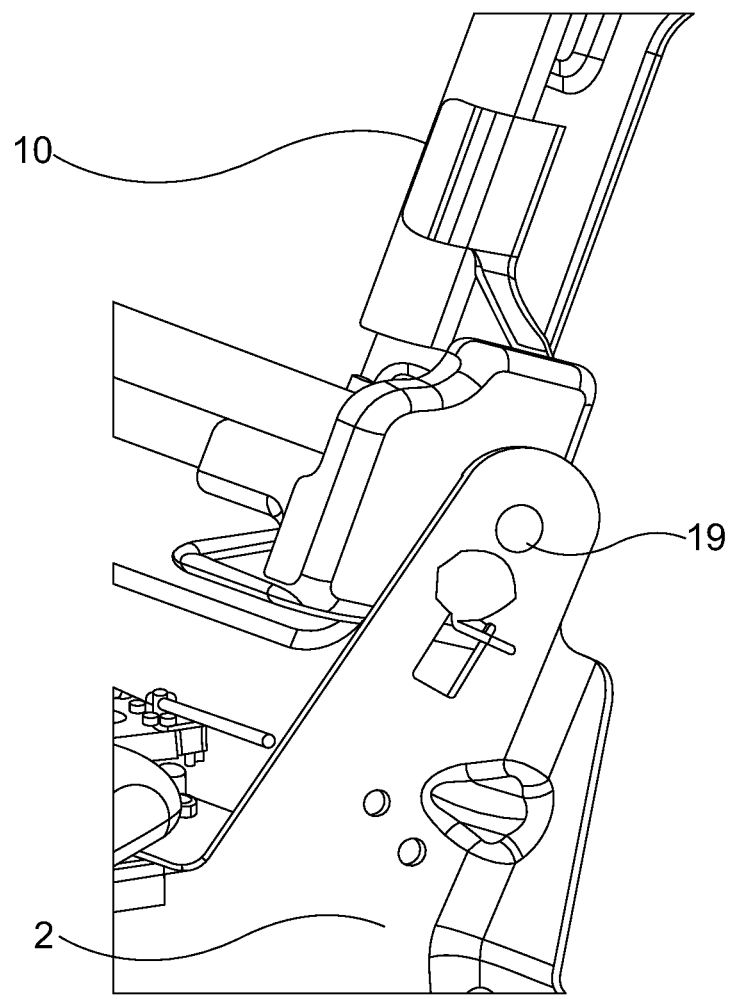
FIG. 3 is an enlarged schematic view of the hinge between the seat backrest and the seat base.
Figure 4:
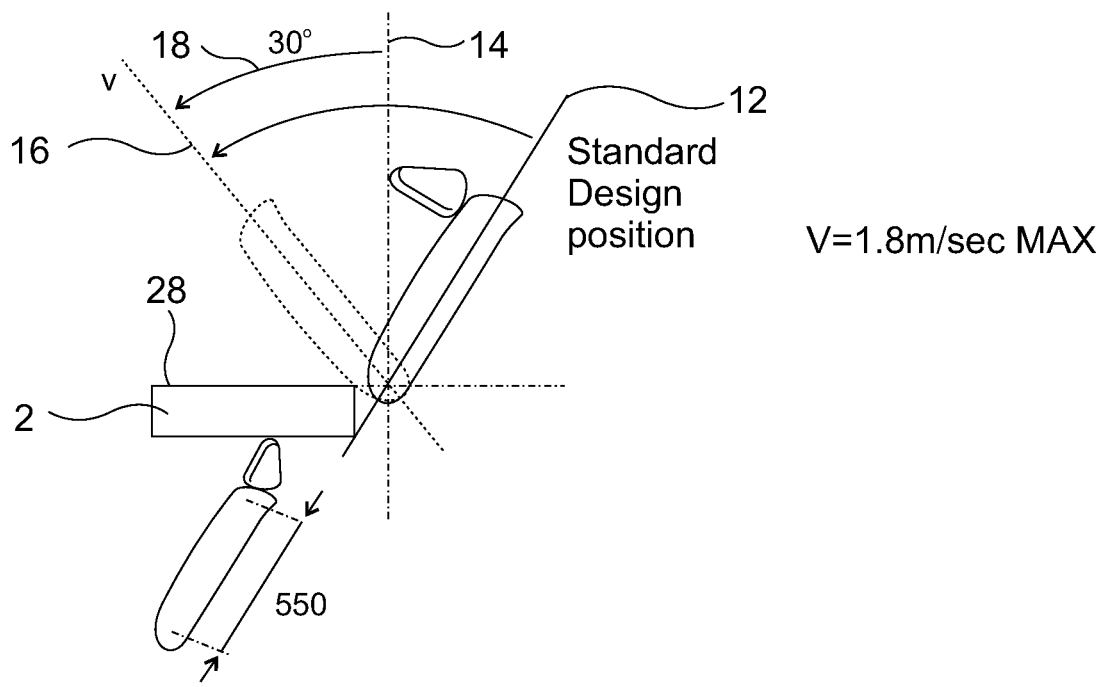
FIG. 4 is a schematic diagram showing the rotation of the seat backrest from a standard design position/seated position, to a position 30° from vertical, which occurs as the seat backrest goes from the standard design/seated position to the folded position.

FIG. 3 is an enlarged view of the hinge area 19 of FIG. 2 that is encompassed by the circle having reference numeral III in FIG. 2. The hinge area 19 has a hinge device that allows pivotal movement of the seat backrest 10 with respect to the seat base 2 about a pivot axis. The hinge area 19 is preferably provided with structure that provides sufficient support for the seat backrest 10, especially in view of automobile safety requirements. Alternatively, additional structure can be provided to meet automobile safety requirements, such as for locking the seat backrest in the seated position.

When the seat backrest 10 is in its standard design/seated position 12, the seat 1 is arranged to support an occupant in the seated position. The standard design position 12 usually has the seat backrest 10 angularly spaced/reclined from a vertical position/axis 14 by a small amount, especially when compared to 10 the angular distance of the folded position 28 from the vertical position/axis 14. This standard design/seated position 12 is usually on a diametrically opposite side of the vertical axis 14 from the seat base 2. The seat backrest 10 therefore angularly moves from the standard design/seated position 12, upward to the vertical position 14 parallel to a vertical axis, then downward through an intermediate position 16. The seat backrest 10 then further moves downward to a folded position 28 where it is more angularly adjacent to the seat base 2. In the embodiment of FIGS. 1-4, this angular movement is in a counterclockwise direction.

For various reasons, it is desirable to limit how fast the seat backrest 10 can be moved in various travel sections from the standard design position 12 to its folded position 28. In particular, it is often desirable to limit how fast the seat backrest 10 moves from the upper most/vertical axis position 14 through the intermediate position 16. The movement from the vertical axis position 14 through the intermediate position 16 is often considered to be a falling movement which is assisted by gravity. Depending on the weight of the seat backrest 10, and the resistance of the hinge connection between the seat backrest 10 and the seat base 2, this falling movement can be excessive fast, which causes disturbance to the person operating the seat, and possibly other occupants of the vehicle, and even possible injury.

In order to limit the speed of the falling movement 18, the present invention provides a damper having guide 20 arranged on one of a portion of the seat base 2 and a portion of the seat backrest 10. The guide 20 has a profile 24 and/or a profile 26. The damper also has a pin 22 is arranged on the other of the seat base 2 and the seat backrest 10. The pin 22 and guide 20 are arranged/positioned on their respective seat base 2 and seat backrest 10 so that the pin 22 slides along/against the profile 24 and/or profile 26 at least partially when the seat backrest 10 moves between the standard design position/seated position 12 and the folded position 28. The pin 22 and the profile(s) 24, 26 are arranged and shaped to create a resistance to movement between the seated position 12 and the folded position 28. The resistance is chosen to limit how fast the seat moves/falls from the seated position 12 to the folded position 28, especially between the vertical axis/position 14 through the intermediate position 16 to the folded position 28.

A significant range of the seat backrest 10 that can be beneficially speed controlled, has been found to be the angular range between the upper most vertical axis/position 14, through the intermediate position 16 to the folded position 28. The intermediate position 16 is preferably in a range which is 20-50 degrees from the vertical axis/position 14 toward the folded position 28. The intermediate position 16 has found that most preferably to be at a position that is 30° from the vertical position 14 toward the folded position 28.

The resistance can be varied by modifying the guide 20, the pin 22 and/or the profile(s) 24/26. It is especially advantageous that the resistance varies as a function of a relative position of the seat backrest 10 to the seat base 2. This varying of the resistance can be done by varying a shape, material, deformation characteristic and/or other properties of the guide 20, the pin 22 and/or the profiles 24/26.

The pin 22 does not need to be circular as shown in the embodiment of the drawings, but the pin 22 could also be a differently shaped structure that interacts with the profile(s) 24/26, such as oval shaped, rectangular shaped or any other shaped structure that interacts with the guide 20 and profile(s) 24/26 to create a desired resistance to movement of the seat backrest 10.

Figure 5:
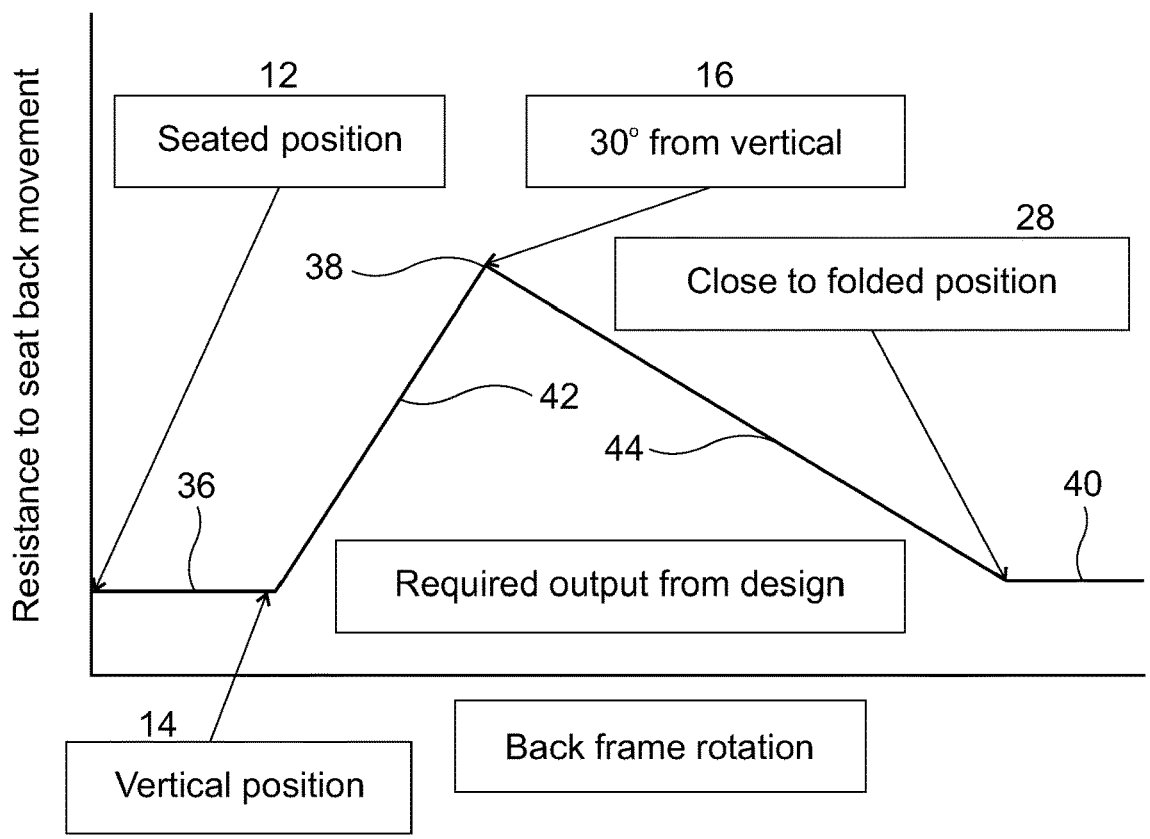
FIG. 5 is a graph showing the relationship between the seat backrest position, in particular the rotational position, on the abscissa, and the resistance to movement the seat backrest movement on the ordinate.
Figure 6:
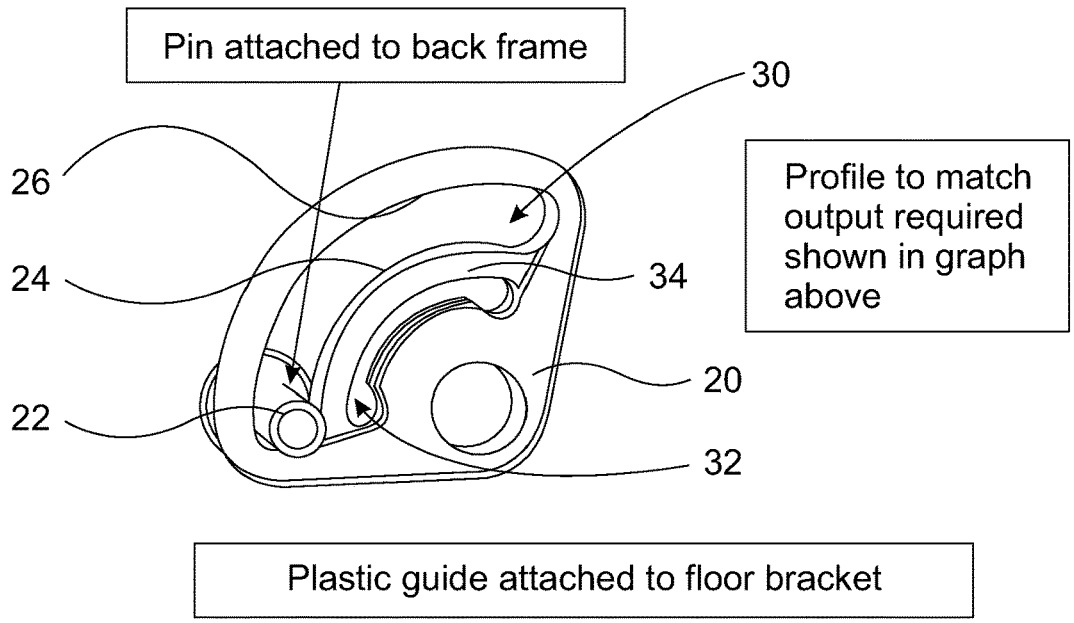
FIG. 6 is a view of the damper with the guide/profile(s) and pin.

One desired resistance function/configuration of the damper is shown in FIG. 5 with the angular position of the seat backrest represented by the abscissa (x axis), and the resistance to seat backrest movement represented on the ordinate (y axis). The resistance of the damper is at a first low level 36 at the seated position 12, and remains at or close to this low level until the uppermost/vertical position 14 is reached. In this section of the movement, gravity is working against the movement of the seat backrest 10, and the only force closing movement of the seat backrest 10 is from the operator. Therefore additional control of the seat backrest 10 is not needed.

The resistance then increases starting at the vertical axis/position 14 to reach a high level 38 at the intermediate position 16. This is done to counteract the force of gravity which is acting to increase the speed of the backrest 10 in its motion toward the folded position 28. The resistance function/configuration of the damper then declines to another low level 40. The decline to the another low level 40 preferably starts at the intermediate position 16 of the seat backrest 10 where gravity starts to contribute less to increasing the speed of the motion. The high level 38 of resistance is preferably a relative/local maximum resistance. Other resistance functions/configurations are possible.

In a preferred embodiment of the damper, the guide 20 is a plate that defines a guide slot 30, with one side of the guide slot 30 forming the profile 24, and another side of the guide slot 30 forming the profile 26.

The pin 22 and the profile(s) 24/26 can create the resistance by varying a shape of the profile(s) 24/26 and/or pin 22. By changing the shape of the pin 22 and/or profile(s) 24/26, the profile(s) 24/26 and pin 22 change the amount of force they apply to each other during movement of the seat backrest 10 toward the seat base 2. This can change the friction between the pin 22 and profile(s) 24/26, which then changes the resistance to movement of the seat backrest 10 toward the seat base 2. The friction can also be changed by other mechanisms such as a change in material or surface finish/texture.

The pin 22 and the profile(s) 24/26 can also create the resistance through deformation of the profile(s) 24/26 by the pin 22. When the pin and the profile(s) 24/26 move past each other, the material of one is moved out of the way by the material of the other. Preferably, the profile(s) 24/26 have sections that are moved as the pin 22 moves past those sections of the profile(s) 24/26. In this way, the resistance between the seat backrest 10 and the seat base 2 can be varied depending on the position of the seat backrest 10 with respect to the seat base 2.

The deformation of the pin 22 and/or the profile(s) 24/26 is preferably elastic deformation so that the pin 22 and/or the profile(s) 24/26 return to their original shape after the pin 22 has moved from one end of the profile(s) to the other. This way the pin 22 and/or the profile(s) 24/26 can again be used to repetitively create the desired resistance each time the seat backrest 10 is moved from the seated position 12 to the folded position 28.

It is also possible that the resistance to movement of the seat backrest 10 from the seated position 12 to the folded position 28 can be caused by a combination of friction between the pin 22 and the profile(s) 24/26, and deformation of either or both pin 22 and the profile(s) 24/26.

The pin 22 and the profile(s) 24/26 can also be arranged, so that the resistance depends on the direction of movement, for example from the seated position 12 to the folded position 28, or in the reverse direction. This can be arranged by appropriately texturing the surface of the pin 22 and profile(s) 24/26 to have a higher resistance in one direction than in another. The pin 22 and profile(s) 24/26 can also be arranged so that the deformation is different depending on the direction, which then changes the resistance. Having the resistance depend on the direction of movement is beneficial so that the resistance is only applied when gravity is acting on the seat backrest 10 to increase the speed of the seat backrest 10 to a value that is higher than desired. In particular, it may be desirable for the resistance between the pin 22 and the profile(s) 24/26 to be as low as possible during movement from the folded position 28 to the intermediate position 16, or even to the vertical position 14. In this way, it is easier to move the seat from the folded position 28 to the seated position 12.

Deformation and friction can also work together to create a resistance to the seat backrest 10 movement. Two significant factors in creating friction, are the surface characteristics, and the forces pressing the two surfaces together. The deformation caused by the arrangement of the pin 22 and the profile(s) 24/26 can vary the force that pushes the pin 22 against the profile(s) 24/26. Thus, the resistance to movement can be created by selectively adjusting the deformation to not only create resistance through the force required for deformation, but also varying the force that creates the friction between surfaces of the pin 22 and the profile(s) 24/26.

In order to further control the deformation, the guide 20 defines a deformation slot 32. A web 34 is arranged between the profile 24 and the deformation slot 32. By adjusting the size and shape of the web 34, especially by varying the size and shape of the deformation slot 32, the deformation of the web 34 and its corresponding profile 24 can be varied or adjusted selectively to give a desired resistance. It is still further possible, that the deformation slot 32 is shaped or sized to allow deformation of the profile 24 and web 34 up to a point, at which point opposite sides of the deformation slot 32 contact each other and thus change the deformation characteristics of the web 34 and profile 24.

In one of the preferred embodiments, the resistance to movement of the seat backrest 10 preferably has a maximum resistance at the intermediate position 16 of the seat backrest 10, and this intermediate position 16 is preferably between 20 degrees and 50 degrees from the vertical position 14 in an angular direction towards the folded position 28. The function of the resistance to movement changes at a first rate 42 from the minimum/low-level 36 to the maximum/high-level 38 as the seat backrest 10 moves from the seated position 12 to the intermediate position 16. The function of the resistance to movement changes at a second rate 44 from the maximum/high-level 38 to the minimum/another low-level 40 as the seat backrest 10 moves from the intermediate position 16 to the folded position 28. The first rate 42 is preferably higher than the second rate 44. The function of the resistance is sometimes preferred to be substantially constant between the seated position 12 and the vertical position 14. It is further sometimes desirable that the function of the resistance is substantially continually decreasing between the maximum/high-level 38 and the folded position 28.

While specific embodiments of the invention have been shown and described in detail to illustrate the application of the principles of the invention, it will be understood that the invention may be embodied otherwise without departing from such principles.

What is claimed is:

1. A seat assembly, comprising:
   a seat backrest selectively positionable between a first position and a second position;
   a seat base configured to cooperate with said seat backrest;
   a guide disposed adjacent one of said seat base and said seat backrest, said guide having a profile; and
   a pin having a first end fixedly coupled to and extending outwardly from one of said seat base and said seat backrest, said pin slideable along said profile when said seat backrest moves between said first position and said second position, said pin and said profile configured to create a resistance to movement between said first position and said second position, said resistance varying as a function of a relative position of said seat backrest to said seat base.

2. The seat assembly in accordance with claim 1, wherein said resistance varies depending on a direction of movement of said seat backrest relative to said seat base.

3. The seat assembly in accordance with claim 1, wherein said pin and said profile create said resistance through friction between said pin and said profile.

4. The seat assembly in accordance with claim 1, wherein said guide includes a guide slot, two sides of said guide slot form said profile.

5. The seat assembly in accordance with claim 1, wherein said pin and said profile create said resistance by varying a shape of one of said pin and said profile.

6. The seat assembly in accordance with claim 1, wherein said guide includes a guide slot, one side of said guide slot forms said profile.

7. The seat assembly in accordance with claim 6, wherein said pin includes a free second end extending outwardly from said one of said seat base and said seat backrest and through said guide slot.

8. The seat assembly in accordance with claim 1, wherein said pin and said profile create said resistance through deformation of said profile by said pin.

9. The seat assembly in accordance with claim 8, wherein said guide defines a deformation slot, a web is formed between said profile and said deformation slot, said web being arranged to deform when said seat backrest moves between said first position and said second position.

10. The seat assembly in accordance with claim 9, wherein said guide defines a guide slot, one side of said guide slot forms said profile.

11. The seat assembly in accordance with claim 9, wherein said guide defines a guide slot, two sides of said guide slot form said profile.

12. The seat assembly in accordance with claim 8, wherein said pin and said profile create said resistance through friction between said pin and said profile.

13. The seat assembly in accordance with claim 1, wherein said resistance being at a first low level at said first position, said resistance being at a high level at an intermediate position between said first and second positions, said resistance decreasing from said high level to a second low level as the seat backrest moves from said intermediate position to said second position.

14. The seat assembly in accordance with claim 13, wherein a function of said resistance is substantially continually decreasing between said intermediate position and said second position.

15. The seat assembly in accordance with claim 13, wherein a function of said resistance changes at a first rate from said first low level to said high level as said seat backrest moves from said first position to said second position; said function of said resistance changes at a second rate from said high level to said second low level as said seat backrest moves from said first position to said second position, said first rate being higher than said second rate.

16. The seat assembly in accordance with claim 13, wherein a function of said resistance is substantially constant between said first position and a vertical position.

17. The seat assembly in accordance with claim 13, wherein said first position of the seat backrest is angularly spaced from said seat base, said second position of said seat backrest is angularly closer to said seat base than said first position.

18. The seat assembly in accordance with claim 17, wherein said seat backrest passes through a vertical position as said seat backrest moves from said first position to said second position; said intermediate position of said seat backrest is arranged between said vertical position and said second position.

19. The seat assembly in accordance with claim 18, wherein said intermediate position is between 20 degrees and 50 degrees from said vertical position.

* * * * *